United States Patent
Lilliestråle

(10) Patent No.: US 12,433,382 B2
(45) Date of Patent: Oct. 7, 2025

(54) WOODEN SMARTPHONE CASE FOR AN ELECTRONIC DEVICE

(71) Applicant: Bark Sweden AB, Stockholm (SE)

(72) Inventor: Richard Lilliestråle, Stockholm (SE)

(73) Assignee: Bark Sweden AB, Stockholm (SE)

( * ) Notice: Subject to any disclaimer, the term of this patent is extended or adjusted under 35 U.S.C. 154(b) by 308 days.

(21) Appl. No.: 18/260,574

(22) PCT Filed: Dec. 16, 2021

(86) PCT No.: PCT/EP2021/086102
§ 371 (c)(1),
(2) Date: Jul. 6, 2023

(87) PCT Pub. No.: WO2022/152493
PCT Pub. Date: Jul. 21, 2022

(65) Prior Publication Data
US 2024/0049846 A1     Feb. 15, 2024

(30) Foreign Application Priority Data
Jan. 15, 2021 (SE) .................... 2100007-0

(51) Int. Cl.
*A45C 11/00* (2006.01)

(52) U.S. Cl.
CPC ............. *A45C 11/00* (2013.01); *A45C 11/002* (2025.01)

(58) Field of Classification Search
CPC ..... A45C 11/00; A45C 11/002; G06F 1/1656; H04B 1/3888; H04M 1/185
See application file for complete search history.

(56) References Cited

U.S. PATENT DOCUMENTS

| | | | |
|---|---|---|---|
| 2008/0233338 A1* | 9/2008 | Tsai | G06F 1/1616 428/98 |
| 2009/0052129 A1* | 2/2009 | Tsai | B29C 45/0055 361/679.01 |
| 2014/0287802 A1* | 9/2014 | Walker | H04B 1/3888 455/575.1 |

(Continued)

FOREIGN PATENT DOCUMENTS

EP     0143094 A2     5/1985

OTHER PUBLICATIONS

Search Report in PCT/EP2021/086102, issued Apr. 7, 2022.

*Primary Examiner* — David Tung
(74) *Attorney, Agent, or Firm* — Schott, P.C.

(57) ABSTRACT

A wooden smartphone case for a portable rectangular electronic device includes a compartment configured to receive and hold the electronic device. The wooden smartphone case includes a main body member, opposite side walls, and a first end wall member and a second end wall member attached to the main body member. Each of the first and second end wall members has a height corresponding to the height of the side walls. At least one of the side walls is structured to apply a force in a perpendicular direction with regard to a longitudinal extension of the at least one side wall, such that an electronic device being arranged in the compartment is held in the compartment, wherein the at least one side wall is structured to apply the force against the electronic device arranged in the compartment along a predetermined length section of the at least one side wall.

12 Claims, 2 Drawing Sheets

(56) References Cited

U.S. PATENT DOCUMENTS

2015/0053730 A1* 2/2015 Saks .................... H04M 1/185
  224/191
2015/0295618 A1 10/2015 Johnson et al.

* cited by examiner

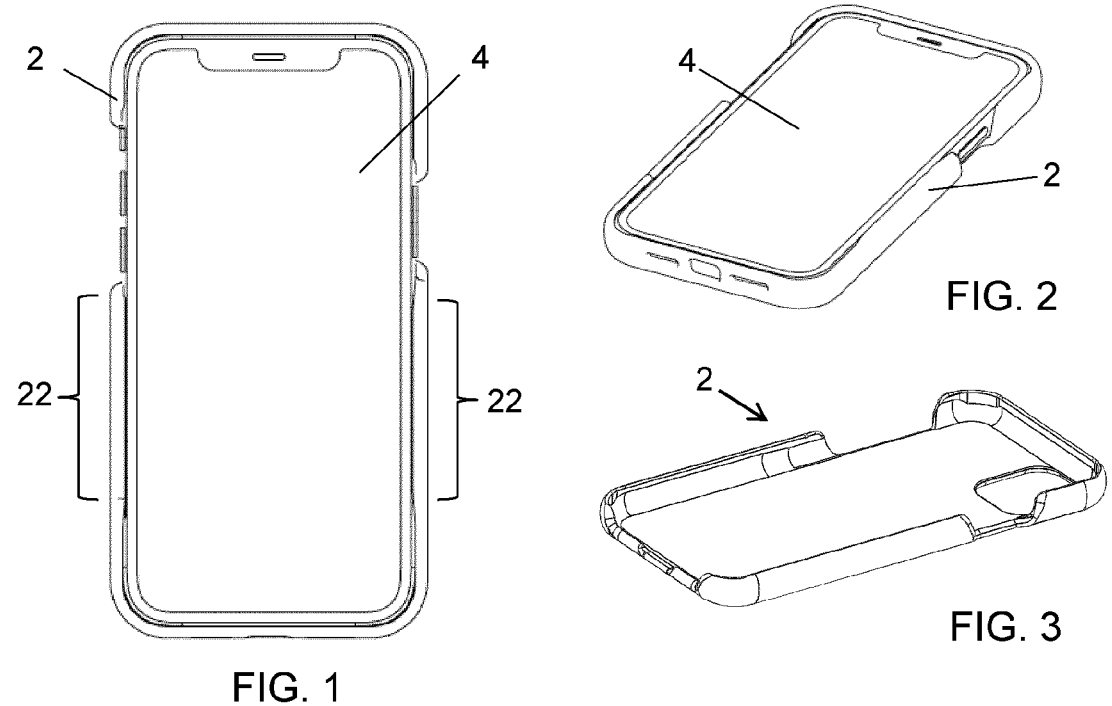
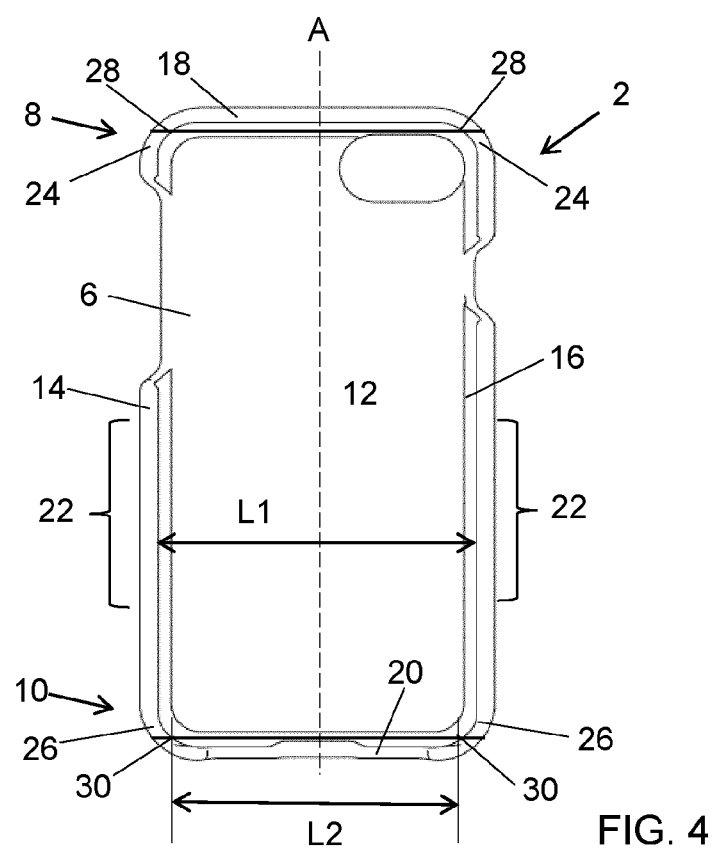

WOODEN SMARTPHONE CASE FOR AN ELECTRONIC DEVICE

TECHNICAL FIELD

The present disclosure relates to a wooden smartphone case, or shell, for electronic devices with a flat screen, such as mobile phones, tablets and similar screen electronics, having a shape of a thin rectangular parallelepiped.

BACKGROUND

Today, protective cases, shells, or covers, used for mobile phones, are to a large extent made of plastic. The large amount of these plastic cases can be described as covering most of all surfaces except the screen. They have openings for the charger hole and for connection of other devices, e.g. microphone holes, and they are normally no more than about two millimeters thick. To be attached to the phone, the walls have an overhang that the phone snaps past; this snap is made possible by the flexibility of the plastic. Plastic is a unique material that is both durable and inexpensive to use for making products. In recent times, the negative effects of plastic on the environment and climate have received increasing attention, as it is often made from fossil resources and contributes to the littering of our planet. More and more plastic products are starting to be replaced with wood or other cellulose-based materials. Straws are made, for example, from reeds or paper. However, replacement wood products are rarely used where fine mechanical precision or durability is required. Plastic is in many cases difficult to replace with wood when good mechanical properties are required.

Wood is an orthotropic material. Its durability, and its expansion due to humidity, differ in the longitudinal, radial and tangential directions. Orthotropic materials have three perpendicular main directions with different properties in each direction. Anisotropic materials have no symmetries at all.

Thus, wood is an orthotropic material, made up of fibers that all lie in essentially the same direction. This fiber direction is of utmost importance when wood is to replace plastic and be used as a case for e.g. mobile phones, as herein. The durability is sometimes 50 times better if the fibers are in the optimal direction. A case made from a single piece of wood has short fibers on the two short side walls that are perpendicular to the direction of the fibers and long fibers along the longer side walls. The length of the short fibers then becomes equal to the thickness of the shell, which means that they do not become sufficiently resistant to the two usual load cases, shocks and bends, but will crack between the fibers. Shocks against the case occur in, for example, falls to the floor and these mainly hit one of the four corners. Bends occur, for example, when the mobile phone is to be snapped in and must be pushed past the overhang on the walls that enclose the sides of the mobile phone when it is in place. The stress from shocks and bends is problematic and makes it difficult to manufacture a functional wooden smartphone case, with a thickness similar to a plastic case. There are plastic cases with a sheet of veneer that covers the flat back of the case. In that case, the wood has only a cosmetic effect and the properties of the plastic provide the function and durability. There are also thick-walled wooden cases but they cannot be bent to allow snapping past the overhang. These rigid cases are often divided into two parts, and the phone is pushed into one part and the other is put in place and must be held by, for example, a buckle.

The following patent documents disclose examples of cases for mobile phones.

JP-3181377 relates to a wooden exterior material for electronic devices. The used exterior material comprises various portions put together having different directions of the wooden fibres. The electronic device is press-fitted into the wooden exterior material by using cushioning materials made by rubber.

U.S. Pat. No. 9,780,824 relates to a case for a mobile electronic device with friction containment. The case is e.g. made from engineered wood products, for example plywood, particle board or oriented strand board.

One of the difficulties with wood is its varied humidity ratio, i.e. the proportion of water of its total weight mass. The humidity in the wood follows the variations in air humidity. For a country with seasons as Sweden, this means that the air contains more moisture in summer than in winter. Products made of wood that will spend a lot of time indoors will contain a higher proportion of water in summer than in winter. Due to the dry indoor air in wintertime. The difference between the seasons typically gives a difference of 6 percentages for indoor wood. There are tables for the difference in form per percentage unit. For a product having the size of a mobile case, the differences are such that a case made in the winter will expand in the summer.

This expansion means that the case will become loose, and is perceived as less qualitative. If you compensate for this by making the inner dimension smaller, you get a case that can become too tight, especially as the wood would shrink. Sensitive parts may then break in connection with snapping on the case on the smartphone.

A further factor is that different customers have different lifestyles, some are more indoors, some more outdoors, some in humid areas, others in less humid areas.

As plastic is a material that many environmentally conscious people do not want to consume, the general object of the present invention is to achieve an equivalent product made of wood that fulfils required resistance to shocks and bends, and with all its environmental benefits, and thus a more favourable environmental footprint.

A more specific object of the present invention is to achieve a wooden smartphone case that has properties that are comparable to a case that consists of plastic, where also the specific requirements for manufacturing a smartphone case made from wood is considered, e.g. with regard to how wood is affected by moisture.

SUMMARY

The above-mentioned objects are achieved by the present invention according to the independent claims.

Preferred embodiments are set forth in the dependent claims.

An important feature of the wooden smartphone case is that a predetermined length section of at least one of the side walls, is slightly thicker than the other sections of the side walls and is structured to apply a force in a perpendicular direction with regard to a longitudinal extension of at least one side wall, such that an electronic device being arranged in the compartment of the case is held fixated in the compartment. The distance between opposite side walls in a perpendicular direction along the predetermined length section defines a first distance L1 being related to the width of said electronic device such that said first distance L1 is a predetermined percentage less than the width of said electronic device, and preferably in the range of 0.1-0.7% less than the width of said electronic device. The length section is provided a distance from the ends of the side walls. This is important since the thinner parts of the side walls apart from the predetermined length sections have larger flexibilities than the predetermined length section has, and thereby provide a spring-like force to the predetermined length section, that in turn is applied to the electronic device to hold it in the compartment. In addition, the predetermined length section should be at a distance from the glued joints to the first and second end wall members, because the glued joints should not be subjected to forces. Thus, the predetermined length section will act as a spring that urges against the phone. The tension of the spring part will vary with the humidity ratio of the wood, but the design is made such that it is allowed to be in contact with the phone and provide a pressure against the phone irrespective of the moisture content within set ranges. The spring part is provided with fibers along the longitudinal axis of the case, i.e. long fibers that will be slightly elastic in a direction perpendicular to the longitudinal axis of the case. The allowed movement, i.e. the working range, of the spring part is approximately +/-0.3 mm.

To ascertain that the wooden smartphone case will withstand outside forces of the edges for example if the case with the electronic device is dropped on the floor, the side walls of the case are provided with end portions at the first and second ends of the main body member. Each of the end portions is equally bent inwardly in a direction against the end portion of the opposite side wall, such that the distance between the ends of the end portions at each of the first and second ends of the main body member at the inside of the compartment defines a second distance L2 being less than the width of the electronic device, and wherein the second distance L2 is less than the first distance L1.

The glued joints between the main body member and the first and second end wall members close to the edges may be a potential breaking point when the phone in its wooden case hits the ground, as there will be an impact on the wooden case. By providing the above described inwardly bent ends of the side walls, these parts will take up the forces and thereby protect the glue joints.

The mechanics is the following when the phone in its wooden case hits the floor:
1) The force from the floor to the case is not dangerous as it presses the glued joint together in a direction where the joint is not stressed.
2) The case has stopped and the phone has yet to be retarded. The phone has a lot of kinetic energy that is going to slow down and its direction of force might not be opposite of the force between floor and case.
3) When the phone engages the case from the inside the glued joint might break if it has to take the impact.

The design of the case is such that the phone does not touch the bottom part that is connected by glue. The kinetic force is taken up by the main body member and particularly by the feature that the side walls of the main body member are slightly bent close to the glued joints for connection to the end wall members. Thus, it is the bended side walls close to the joint that stop, i.e. retard, the movement of the phone, and prevent breakage of the joint.

The wooden smartphone case is made by a milling procedure using a milling tool. Before milling the wooden smartphone case from wooden pieces glued together, the humidity ratio of the wood must be determined, and should be at a maximum of approximately 7-8% to be acceptable. If it is too high, the case may shrink after milling more than there is play in the case, and then there is a risk that the case will break where it cannot flex. It often shrinks a little after milling and the design of the case has been made such that there is room for that. The milled case, which is approximately 2-3 mm thin, quickly gets a moisture content of a few percent especially during winter, i.e. when the air contains less humidity indoors. Therefore, in order to achieve a wooden smartphone case that fulfills all requirements it is necessary to check the humidity on all planks used for manufacturing. More particularly, the expansion due to moisture is caused by moisture being sucked up by the material between the wooden fibers resulting in that a piece of wood essentially expands in a direction perpendicular to the direction of the wooden fibers. This is one reason for providing the predetermined length section a distance from the ends of the side walls, i.e. allowing the slightly thicker part of the side wall to apply a constant pressure and keep the device in place without any gap throughout varying humidity cycles.

BRIEF DESCRIPTION OF THE DRAWINGS

FIG. 1 is a view from above of an electronic device arranged in a wooden smartphone case according to the present invention.

FIG. 2 is a perspective view of an electronic device arranged in a wooden smartphone case according to the present invention.

FIG. 3 is a perspective view of a wooden smartphone case according to the present invention.

FIG. 4 is a view from above of a wooden smartphone case according to the present invention.

DETAILED DESCRIPTION

Figure 5:
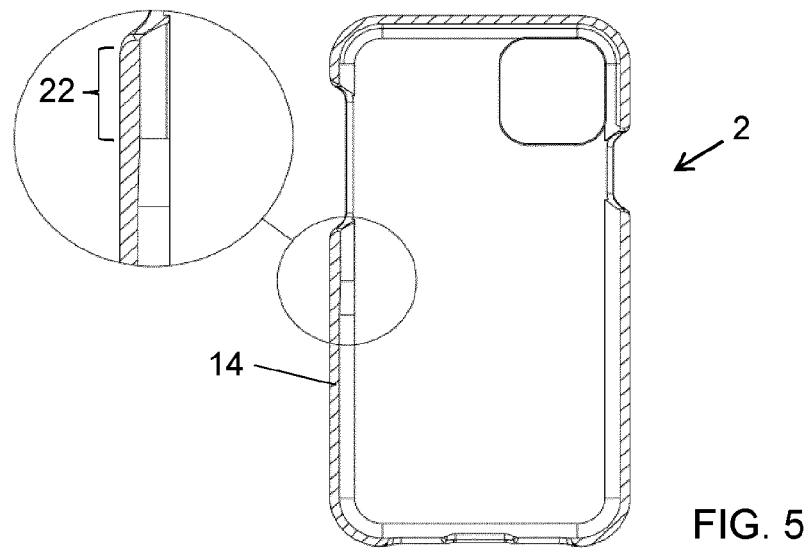
FIG. 5 is a cross-sectional view from above illustrating a detail of a wooden smartphone case according to the present invention.

The wooden smartphone case will now be described in detail with references to the appended figures. Throughout the figures, the same, or similar, items have the same reference signs. Moreover, the items and the figures are not necessarily to scale, emphasis instead being placed upon illustrating the principles of the invention.

First with references to FIGS. 1, 2, and 3, the present disclosure relates to a wooden smartphone case 2 for a portable rectangular electronic device 4 with a flat screen, such as mobile phones, tablets, and similar screen electronics, having a shape of a thin rectangular parallelepiped. The electronic device 4 is provided with a front surface with a display, a width, a length, and a thickness.

The wooden smartphone case 2 defines a compartment intended to receive and hold the electronic device 4 such that the display is visible to a user.

The wooden smartphone case 2 is illustrated in FIG. 4, and has a longitudinal axis A along the length of the electronic device 4 when mounted in the wooden smartphone case. The wooden smartphone case 2 is provided with openings being adapted to the smartphone model, e.g. for attaching the charger, for the microphone, for one or many camera lenses, for attaching a headset, etc.

The wooden smartphone case 2 comprises a main body member 6 having a first end 8 and a second end 10, and comprising a back wall 12 intended to cover a back surface of the electronic device 4, and opposite side walls 14, 16 running along the longitudinal axis A and having an outer height slightly larger than the thickness of the electronic device 4.

The wooden smartphone case 2 further comprises a first end wall member 18 and a second end wall member 20 attached to the first end 8 and the second end 10, respectively, of the main body member 6. Each of the first and second end wall members 18, 20 having a height corresponding to the height of the side walls 14, 16. The end wall members 18, 20 are attached to the main body member by glue.

At least one of the side walls 14, 16 is structured to apply a force in a perpendicular direction with regard to a longitudinal extension of the at least one side wall 14, 16, such that an electronic device 4 being arranged in the compartment is held in the compartment. The at least one side wall 14, 16 is structured to apply the force against the electronic device 4 arranged in the compartment along a predetermined length section 22 of the at least one side wall 14, 16.

The distance between opposite side walls in a perpendicular direction along the predetermined length section 22 defines a first distance L1 being related to the width of the electronic device such that the first distance L1 is a predetermined percentage less than the width of said electronic device.

In an embodiment, the first distance L1 is a predetermined percentage in the range of 0.1-0.7% less than the width of the electronic device.

The at least one side wall 14, 16 is a predetermined percentage thicker at the predetermined length section 22 in comparison to the thickness of the side wall 14, 16 not along the predetermined length section (22), and that the predetermined percentage is in the range of 10-20%, corresponding to 0.3-0.7 mm.

FIG. 5 is a cross-sectional view of the case where the predetermined length section 22 is provided on one of the side walls 14.

In a further embodiment, the predetermined length section 22 of the at least one side wall 14, 16 is in the range of 20-50% of a total length of the side wall, and that the predetermined length section 22 is arranged at a distance of 20-50% of the total length of the side wall from the respective first end wall member 18 and second end wall member 20.

In still a further embodiment, the side walls 14, 16 are provided with end portions 24, 26 at the first and second ends 8, 10 of the main body member 6. Each of the end portions 24, 26 is equally bent inwardly in a direction against the end portion of the opposite side wall, such that the distance between the ends 28, 30 of the end portions 24, 26 at each of the first and second ends 8, 10 of the main body member 6 at the inside of the compartment defines a second distance L2 being less than the width of the electronic device 4, and that the second distance L2 is less than the first distance L1.

The second distance L2 between the ends 28, 30 of the end portions 24, 26 at each of the first and second ends 8, 10 of the main body member 6 at the inside of the compartment is preferably in the range of 5-10% less than the width of the electronic device 4. In another embodiment, the second distance L2 is in the range of 4-8 mm or 5-10% less than the first distance L1.

According to still another embodiment, the side walls 14, 16, and the first and second end wall members 18, 20, making up the compartment, are structured and dimensioned such that a distance, defined as a third distance L3, is provided between the walls and an electronic device 4 arranged in said compartment along the first and second end wall members 18, 20 and along the parts of the side walls 14, 16 not defined as the predetermined length sections 22. The third distance is preferably in the range of 0-1 mm. The third distance L3 is required to ascertain a small play between the electronic device and the walls apart from the predetermined length sections, e.g. to enable that side walls along the predetermined length section may be slightly bent out in order to be able to insert the smartphone into the compartment, and that the force then is applied against the phone to firmly hold it in the compartment.

In a further embodiment, the thicknesses of the side walls 14, 16, and the first end wall member 18, and the second end wall member 20 are in the range of 2-4 mm.

Advantageously, the main body member 6, the first end wall member 18, and the second end wall member 20 are made from wood. The fiber direction of the main body member 6 corresponds to the longitudinal axis A of the electronic device, and the fiber directions of the first end wall member 18, and of the second end wall member 20, are perpendicular to the fiber direction of the main body member 6.

Figure 6:
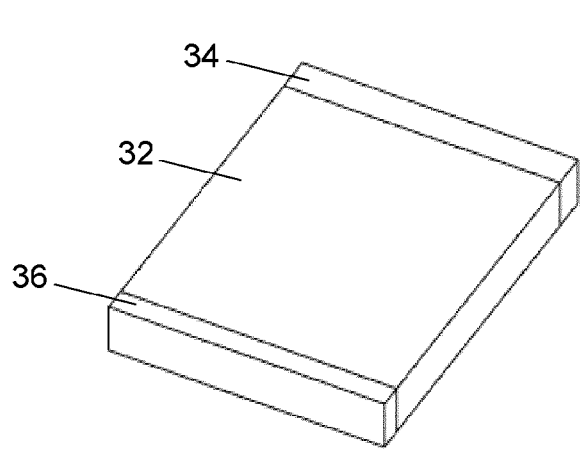
FIG. 6 is a perspective view showing pieces of woods glued together before milling a wooden smartphone case according to the present invention.
Figure 7:
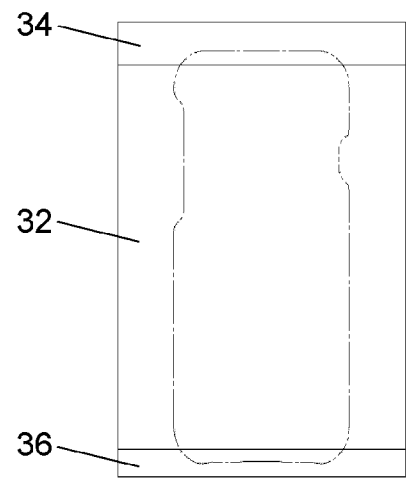
FIG. 7 is a view from above showing the pieces of woods of FIG. 6.
Figure 8:
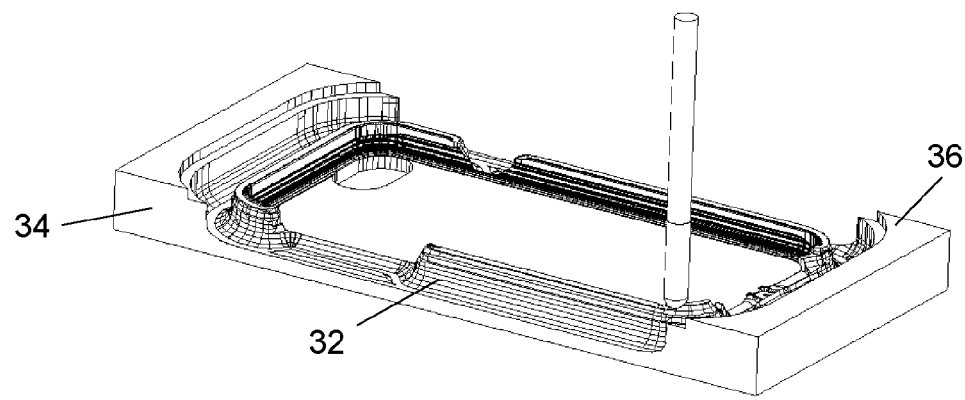
FIG. 8 is a perspective view of the pieces of woods of FIGS. 6 and 7 during a milling procedure using a milling tool.

In another embodiment, the main body member 6, the first end wall member 18, and the second end wall member 20 are made by a milling procedure by a milling machine (see FIG. 8) from pieces 32, 34, 36 (see FIG. 6) of wood glued together prior the milling procedure. FIG. 7 illustrates pieces of wood glued together and the outer shape of the wooden case is sketched on the pieces of wood. The pieces 32, 34, 36 of wood having a humidity ratio in the range 3-10%, preferably in the range of 4-7.5%. The humidity ratio must be determined to have an acceptable value before the pieces of woods are glued together.

In still another embodiment, at least one of the main body member 6, the first end wall member 18, and the second end wall member 20 are made from wood, plywood or Masonite, or similar cellulose-based materials, or combinations thereof.

In one variation wood is used in the main body member 6, and plywood is used in both end wall members 18, 20.

The wooden smartphone case is given a final treatment before use, that e.g. consists of hard wax oil or varnishing with a wood varnish that gives the surface durability and emphasizes the pattern of the wood. The pattern gives each case a unique look in a way that a plastic case cannot obtain. The final treatment may, as an alternative, consist of a coloured decorative wax that creates interesting cosmetic effects together with the wood's natural pattern. On top of the decorative wax, a layer of transparent hard wax oil can be applied to give the surface extra durability.

Different wood species may be applied, e.g. birch, elm, and cherry-tree.

In another variation the main body member 6, the first end wall member 18, and the second end wall member 20 are manufactured, e.g. by a milling procedure, separately and then joined together into a smartphone case.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A wooden smartphone case for a portable rectangular electronic device having a front surface with a display, a width, a length, and a thickness, the wooden smartphone case defines a compartment configured to receive and hold the electronic device such that the display is visible to a user, the wooden smartphone case has a longitudinal axis A along the length of the electronic device when mounted in the wooden smartphone case, the wooden smartphone case comprises:
   a main body member having a first end and a second end, and comprising a back wall configured to cover a back surface of the electronic device, and opposite side walls running along the longitudinal axis A and having an outer height slightly larger than the thickness of the electronic device, and
   a first end wall member and a second end wall member attached to the first end and the second end, respectively, of the main body member, wherein each of the first and second end wall members having a height corresponding to the height of the side walls,
   wherein at least one of the side walls is structured to apply a force in a perpendicular direction with regard to a longitudinal extension of the at least one side wall, such that an electronic device being arranged in the compartment is held in the compartment, wherein the at least one side wall is structured to apply the force against the electronic device arranged in the compartment along a predetermined length section of the at least one side wall, and wherein the distance between opposite side walls in a perpendicular direction along the predetermined length section defines a first distance L1 being related to the width of the electronic device such that the first distance L1 is a predetermined percentage less than the width of the electronic device,
   wherein the at least one side wall is a predetermined percentage thicker at the predetermined length section in comparison to the thickness of the side wall not along the predetermined length section, and wherein the predetermined percentage is in the range of 10-20%, corresponding to 0.3-0.7 mm, and
   wherein the predetermined length section of the at least one side wall is in the range of 20-50% of a total length of the side wall, and wherein the predetermined length section is arranged at a distance of 20-50% of the total length of the side wall from the respective first end wall member and second end wall member.

2. The wooden smartphone case according to claim 1, wherein the first distance L1 is a predetermined percentage in the range of 0.1-0.7% less than the width of the electronic device.

3. The wooden smartphone case according to claim 1, wherein the side walls are provided with end portions at the first and second ends of the main body member, wherein each of the end portions is equally bent inwardly in a direction against the end portion of the opposite side wall, such that the distance between the ends of the end portions at each of the first and second ends of the main body member at the inside of the compartment defines a second distance L2 being less than the width of the electronic device, and wherein the second distance L2 is less than the first distance L1.

4. The wooden smartphone case according to claim 1, wherein the second distance L2 between the ends of the end portions at each of the first and second ends of the main body member at the inside of the compartment is in the range of 5-10% less than the width of the electronic device.

5. The wooden smartphone case according to claim 4, wherein the second distance L2 is in the range of 4-8 mm or 5-10% less than the first distance L1.

6. The wooden smartphone case according to claim 1, wherein the side walls, and the first and second end wall members, making up the compartment, are structured and dimensioned such that a distance, defined as a third distance L3, is provided between the walls and an electronic device arranged in the compartment along the first and second end wall members and along the parts of the side walls not defined as the predetermined length sections.

7. The wooden smartphone case according to claim 6, wherein the third distance is in the range of 0-1 mm.

8. The wooden smartphone case according to claim 1, wherein thicknesses of the side walls, and the first end wall member, and the second end wall member are in the range of 2-4 mm.

9. The wooden smartphone case according to claim 1, wherein the main body member, the first end wall member, and the second end wall member are made from wood, and wherein the fiber direction of the main body member corresponds to the longitudinal axis A of the electronic device, and the fiber directions of the first end wall member, and the second end wall member, are perpendicular to the fiber direction of the main body member.

10. The wooden smartphone case according to claim 1, wherein the main body member, the first end wall member, and the second end wall member are made by a milling procedure from pieces of wood glued together prior the milling procedure, and wherein the pieces of wood having a humidity ratio in the range 3-10%.

11. The wooden smartphone case according to claim 10, wherein the pieces of wood have a humidity ratio in the range 4-7.5%.

12. The wooden smartphone case according to claim 1, wherein at least one of the main body member, the first end wall member, and the second end wall member are made from a group of materials consisting of: wood, plywood or Masonite, or similar cellulose-based materials, or combinations thereof.

* * * * *